(12) United States Patent
Yeh et al.

(10) Patent No.: US 10,434,816 B2
(45) Date of Patent: Oct. 8, 2019

(54) STYLUS

(71) Applicants: Hsin Yeh, Taipei (TW); Chih-Wen Chiang, Taipei (TW); Jyh-Chyang Tzou, Taipei (TW); Wei-Hao Lan, Taipei (TW)

(72) Inventors: Hsin Yeh, Taipei (TW); Chih-Wen Chiang, Taipei (TW); Jyh-Chyang Tzou, Taipei (TW); Wei-Hao Lan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 147 days.

(21) Appl. No.: 15/430,550

(22) Filed: Feb. 13, 2017

(65) Prior Publication Data

US 2017/0239977 A1    Aug. 24, 2017

Related U.S. Application Data

(60) Provisional application No. 62/297,102, filed on Feb. 18, 2016.

(51) Int. Cl.
| | |
|---|---|
| *B43K 24/00* | (2006.01) |
| *B43K 29/00* | (2006.01) |
| *B43K 24/02* | (2006.01) |
| *B43K 24/04* | (2006.01) |
| *G06F 3/0354* | (2013.01) |

(52) U.S. Cl.
CPC ............ *B43K 29/00* (2013.01); *B43K 24/023* (2013.01); *B43K 24/04* (2013.01); *G06F 3/03545* (2013.01)

(58) Field of Classification Search
CPC .......................... G06F 3/03545; B43K 24/023

USPC .................. 401/110–112, 258–260; 345/179
See application file for complete search history.

(56) References Cited

U.S. PATENT DOCUMENTS

| 4,475,834 A * | 10/1984 | Bean ..................... B43K 24/023 |
| | | 401/101 |
| 6,164,855 A * | 12/2000 | Perry ..................... B43K 23/008 |
| | | 15/443 |

FOREIGN PATENT DOCUMENTS

| CN | 101295213 | 10/2008 |
| CN | 101359260 | 2/2009 |
| CN | 103576922 | 2/2014 |
| TW | M459446 | 8/2013 |

OTHER PUBLICATIONS

"Office Action of Taiwan Counterpart Application," dated Nov. 15, 2017, p. 1-p. 10, in which the listed references were cited.

\* cited by examiner

*Primary Examiner* — David J Walczak
*Assistant Examiner* — Joshua R Wiljanen
(74) *Attorney, Agent, or Firm* — JCIPRNET

(57) ABSTRACT

A stylus suitable for an electronic device is provided. The stylus comprises a pen barrel and a core. The pen barrel has a sidewall and at least one first protrusion, and the first protrusion is located at an inner side of the sidewall. The core movably passes through the pen barrel. The core has a pen tip and at least one second protrusion. Under a first status, the first protrusion and the second protrusion are dislocated from each other. Under a second status, the first protrusion and the second protrusion are aligned with each other to make a part of pen barrel expand and deform.

19 Claims, 9 Drawing Sheets

STYLUS

CROSS-REFERENCE TO RELATED APPLICATION

This application claims the priority benefit of U.S. provisional application Ser. No. 62/297,102, filed on Feb. 18, 2016. The entirety of the above-mentioned patent application is hereby incorporated by reference herein and made a part of this specification.

BACKGROUND

1. Technical Field

The present disclosure relates to a stylus, and in particular, to a stylus for an electronic device.

2. Description of Related Art

Currently, most electronic devices, for example, smartphones, tablet computers, or some of notebook computers are configured with a touchscreen, and a user can operate the foregoing electronic device by means of touching the touchscreen. Or, the user operates the foregoing electronic device by using a touchpad electrically coupled, in a wired or wireless manner, to the foregoing electronic device. Generally, the user can touch the touchscreen or touchpad by using a finger, to operate the foregoing electronic device to execute most functions. However, in some cases, for example, writing, drawing or other actions that need accurate tapping, the user needs a stylus to accurately perform a tapping action on the touchscreen or touchpad.

By using a stylus integrated in the electronic device as an example, when the user does not need to the use the stylus, the user accommodates the stylus in the electronic device in most cases. To satisfy a slim design trend of an electronic device, a size of the stylus is also reduced. However, an excessively thin stylus has poor holding or operating hand feeling. Therefore, how to satisfy the slim design trend of an electronic device while keeping a hand feeling of holding or operating the stylus by a user has become one of problems to be resolved by related manufacturers.

SUMMARY

The present disclosure provides a stylus, which can provide good holding or operating hand feeling of a user.

The present disclosure provides a stylus, suitable for an electronic device. The stylus comprises a pen barrel and a core. The pen barrel has a sidewall and at least one first protrusion, and the first protrusion is located at an inner side of the sidewall. The core movably passes through the pen barrel. The core has a pen tip and at least one second protrusion. Under a first status, the first protrusion and the second protrusion are dislocated from each other. Under a second status, the first protrusion and the second protrusion are aligned with each other to make a part of the pen barrel expand and deform.

In an embodiment of the present disclosure, the foregoing pen barrel further has a holding portion, and the first protrusion is located at an inner side of the sidewall corresponding to the holding portion. Under the second status, the first protrusion and the second protrusion are aligned with each other to make the holding portion of the pen barrel expand and deform.

In an embodiment of the present disclosure, the foregoing stylus further comprises a pen cap, sleeved on the holding portion.

In an embodiment of the present disclosure, the pen barrel further has a plurality of slits, and the slits are located on the holding portion. An extending direction of each of the slits is parallel to a moving direction, in which the core moves back and forth relative to the pen barrel.

In an embodiment of the present disclosure, the foregoing stylus further comprises a pen cap which is sleeved on the holding portion and covers the slits.

In an embodiment of the present disclosure, the first protrusion has a first surface, and the second protrusion has a second surface. Under the first status, the first surface and the second surface are separated from each other. Under the second status, the first surface abuts against the second surface to make a part of the pen barrel expand and deform.

In an embodiment of the present disclosure, the number of the first protrusion is plural, and a recess is defined between any adjacent two of the first protrusions. Under the first status, the second protrusion is accommodated in the recess.

In an embodiment of the present disclosure, the number of the first protrusion is plural and the number of the second protrusion is plural. A first recess is defined between any adjacent two of the first protrusions and a second recess is defined between any adjacent two of the second protrusions. Under the first status, some of the second protrusions are respectively accommodated in the first recesses, and some of the first protrusions are respectively accommodated in the second recesses.

In an embodiment of the present disclosure, the foregoing core further has a first rod portion and a second rod portion opposite to each other, the pen tip and the second rod portion are respectively located on opposite two sides of the first rod portion. The pen tip is connected to the first rod portion, and the second protrusion is located on the first rod portion.

In an embodiment of the present disclosure, the stylus further comprises an elastic component, abutting against the first rod portion and the second rod portion. When the stylus is accommodated in the electronic device, the stylus is in the first status and the elastic component is compressed to generate elastic deformation. When the stylus is moved out of the electronic device, the elastic component restores to drive the first rod portion and the pen tip to move, so that the stylus switches from the first status to the second status.

In an embodiment of the present disclosure, under the first status, the pen tip is retracted in the pen barrel, and under the second status, the pen tip is exposed out of the pen barrel.

In an embodiment of the present disclosure, the foregoing core further comprises an end portion. The pen tip and the end portion are respectively located on opposite two sides of the second protrusion; and the end portion is exposed out of the pen barrel.

In an embodiment of the present disclosure, the foregoing stylus further comprises an elastic component, sleeved on the core and located in the pen barrel. The pen barrel further comprises a position limiting portion located at the inner side of the sidewall, and the elastic component abuts against the position limiting portion and the end portion. When the stylus is accommodated in the electronic device, the stylus is in the first status; and the elastic component is compressed to generate elastic deformation. When the stylus is moved out of the electronic device, the elastic component restores and drives the end portion to drive the core to move, so that the stylus switches from the first status to the second status.

In an embodiment of the present disclosure, the foregoing pen tip is exposed out of the pen barrel under the first status and the second status.

Based on the above, a thickness of a part of the pen barrel of the stylus of the present disclosure is variable. When a user needs to perform a tapping action on a touchscreen or a touchpad by means of a stylus, the user may make a part of a pen barrel expand and deform, so that the part of the pen barrel is thickened, thereby providing good holding or operating hand feeling of the user.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
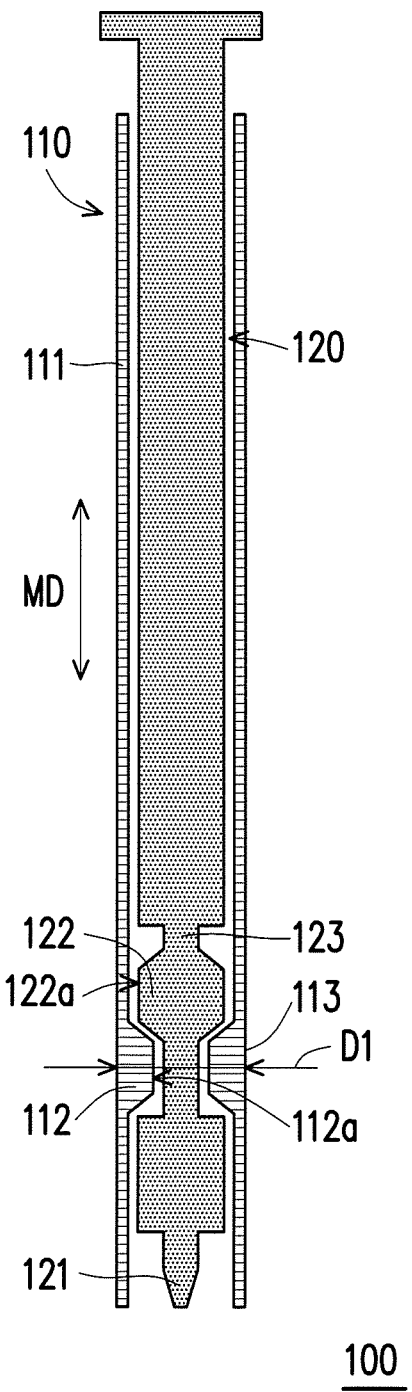
FIG. 1A and FIG. 1B are schematic cross-sectional views of switching from a first status to a second status by a stylus according to a first embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
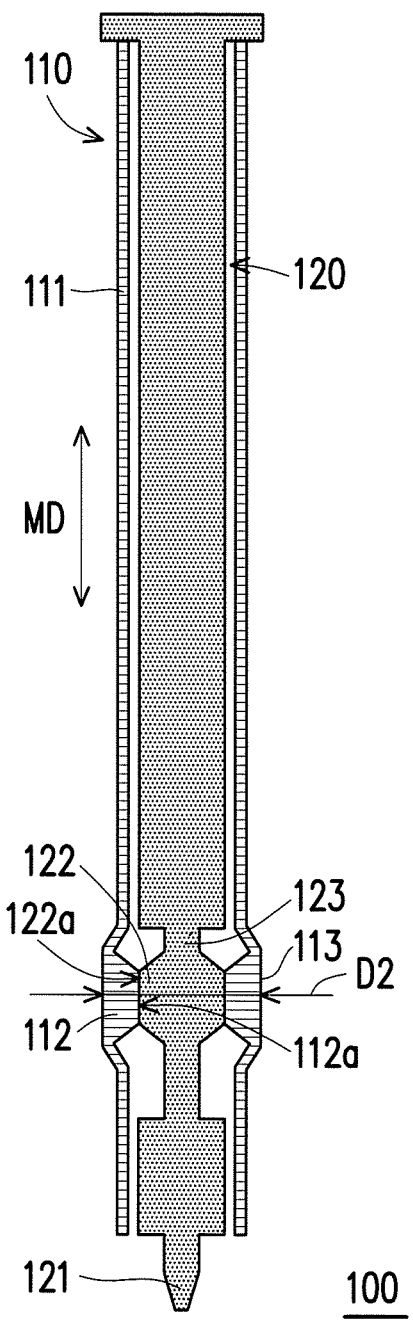

FIG. 1A and FIG. 1B are schematic cross-sectional views of switching from a first status to a second status by a stylus according to a first embodiment of the present disclosure. A stylus 100 shown in FIG. 1A is in the first status, and the stylus 100 shown in FIG. 1B is in the second status. Referring to FIG. 1A and FIG. 1B, in the present embodiment, the stylus 100 can accurately perform a tapping action on a touchscreen or a touchpad, to control a smartphone, a tablet computer, or a notebook computer to execute a corresponding function. The stylus 100 comprises a pen barrel 110 and a core 120, where the pen barrel 110 may be a hollow pipe configured to accommodate the core 120. On the other hand, the pen barrel 110 may be formed of a material that has elasticity and ductility, for example, a polymer, a metal, a memory metal, an alloy, a composite material, or other material that has elasticity and ductility. Therefore, the pen barrel 110 may generate suitable elastic deformation after being pushed or pressed. The core 120 may be formed of a material, for example, a metal, an alloy, a polymer, ceramics, or glass, and with respect to the pen barrel 110, the core 120 has relatively high rigidity.

The pen barrel 110 has a sidewall 111 and a first protrusion 112. The first protrusion 112 is located at an inner side of the sidewall 111, and the first protrusion 112 may be an annular structure or an island-shaped structure that protrudes from the inner side of the sidewall 111. However, the present disclosure is not limited thereto. The core 120 movably passes through the pen barrel 110. The core 120 has a pen tip 121, a second protrusion 122, and a rod portion 123. The pen tip 121 is connected to the rod portion 123, and the second protrusion 122 may be an annular structure or an island-shaped structure that protrudes from a periphery of the rod portion 123. However, the present disclosure is not limited thereto. Under the first status, the pen tip 121 is retracted in the pen barrel 110, and the pen tip 121 and the second protrusion 122 are respectively located on opposite two sides of the first protrusion 112. That is, the first protrusion 112 and the second protrusion 122 are dislocated from each other. An outer diameter of the sidewall 111 where the first protrusion 112 is located is D1, and the outer diameter D1 is about 5 to 6 mm.

For example, a user may make the core 120 move back and forth along a moving direction MD by means of rotation, pushing-pulling, or the like. When the core 120 moves along the moving direction MD to make the pen tip 121 exposed out of the pen barrel 110, the stylus 100 switches from the first status to the second status, and the first protrusion 112 and the second protrusion 122 are aligned with each other to make a part of the pen barrel 110 expand and deform, as shown in FIG. 1B. In this case, an outer diameter of the sidewall 111 where the first protrusion 112 is located is D2, and the outer diameter D2 is about 9 to 10 mm. That is, after the stylus 100 is made to switch from the first status to the second status, the outer diameter of the sidewall 111 where the first protrusion 112 is located can be enlarged from D1 to D2, so as to provide good holding or operating hand feeling of the user. On the contrary, when the user makes the core 120 move along the moving direction MD by means of rotation, pushing-pulling, or the like to make the pen tip 121 retracted in the pen barrel 110, the stylus 100 can return to the first status from the second status; the first protrusion 112 and the second protrusion 122 are dislocated from each other, and the pen barrel 110 that has elasticity and ductility can return to a status before expansion and deformation, as shown in FIG. 1A.

In detail, a part, where the first protrusion 112 is disposed, of the pen barrel 110 may be defined as a holding portion 113. In other words, the first protrusion 112 is located at the inner side, which corresponds to the holding portion 113, of the sidewall 111. Under the second status, the holding portion 113 of the pen barrel 110 expands and deforms because the first protrusion 112 and the second protrusion 122 abut against each other, so as to provide good holding or operating hand feeling of the user. As shown in FIG. 1A and FIG. 1B, the first protrusion 112 has a first surface 112a, and the second protrusion 122 has a second surface 122a. Under the first status, the first surface 112a and the second surface 122a are separated from each other. Under the second status, the first surface 112a abuts against the second surface 122a to make the holding portion 113 of the pen barrel expand and deform. In the present embodiment, cross-sectional shapes of the first protrusion 112 and the second protrusion 122 may be trapezoids, but the present disclosure is not limited thereto. In other embodiments, cross-sectional shapes of the first protrusion and the second protrusion may be rectangles, semicircles, semiellipses, or other suitable geometrical shapes.

Other embodiments will be listed below for description. It should be noted herein that the following embodiments still use reference signs and partial content of the foregoing embodiment; same reference signs are used to represent same or similar elements, and description of same technical content is omitted. The foregoing embodiment may be referred to for description of the omitted part, and details are not described again in the following embodiments.

Figure 2A:
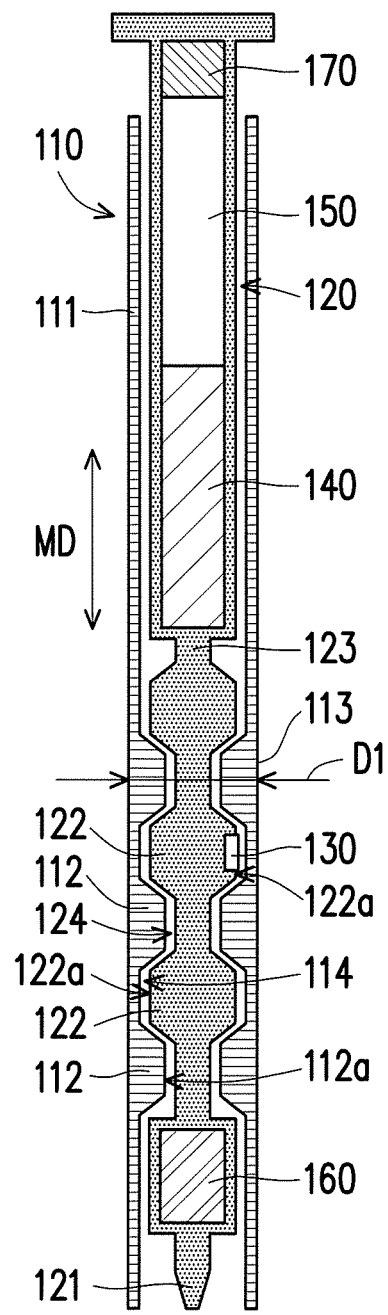
FIG. 2A and FIG. 2B are schematic cross-sectional views of switching from a first status to a second status by a stylus according to a second embodiment of the present disclosure.
Figure 2B:
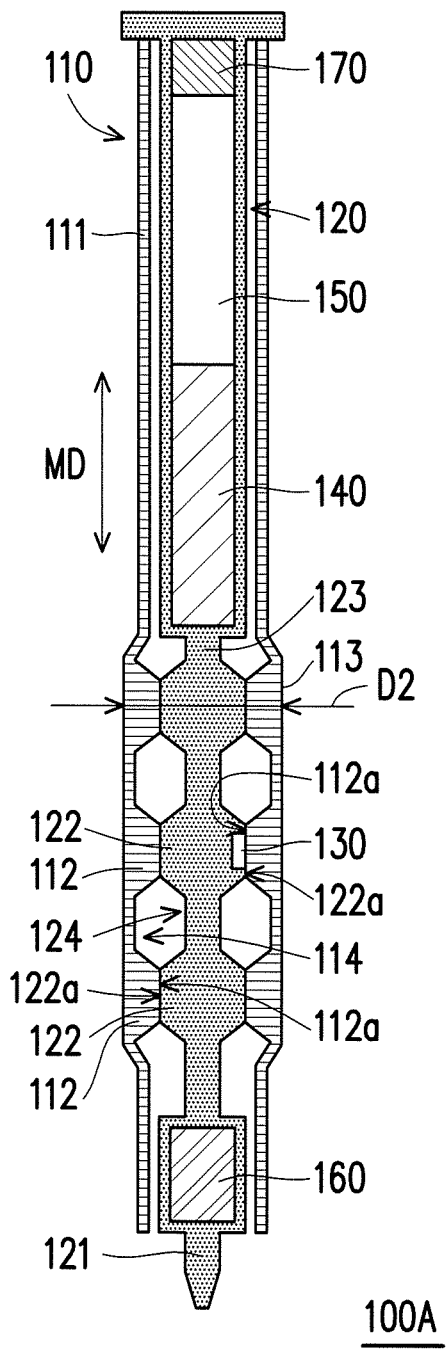

FIG. 2A and FIG. 2B are schematic cross-sectional views of switching from a first status to a second status by a stylus according to a second embodiment of the present disclosure. Referring to FIG. 2A and FIG. 2B, a stylus 100A of the present embodiment is approximately similar to the stylus 100 of the first embodiment, and the main difference lies in that: in the present embodiment, the number of the first protrusion is plural and the number of the second protrusion disposed corresponding to the first protrusions 112 is plural. A recess 114 is defined between any adjacent two of the first protrusions 112 and a second recess 124 is defined between any adjacent two of the second protrusions 122. Under the first status (a pen tip 121 is retracted in a pen barrel 110), the first protrusions 112 and the second protrusions 122 are dislocated from each other, some of the second protrusions 122 are respectively accommodated in the first recesses 114 and some of the first protrusions 112 are respectively accommodated in the second recesses 124. Under the second status (the pen tip 121 is exposed out of the pen barrel 110), the first protrusions 112 are moved out of the second recesses 124 and the second protrusions 122 are moved out of the first recesses 114, so that each of the second protrusions 122 is aligned with the corresponding first protrusion 112. In a case in which the first protrusions 112 and the corresponding second protrusions 122 abut against each other, a holding portion 113 where the first protrusions 112 are located expands and deforms. Because in the present embodiment, the number of the first protrusion is plural and the number of the second protrusion is plural, which are distributed in a large range, a range of the holding portion 113 is also enlarged, so as to provide a relatively large holding range of the user.

On the other hand, the stylus 100A may comprise a button 130, a circuit board 140, a battery 150, a first sensor 160, and a second sensor 170. The button 130 is disposed on a rod portion 123, and for example, is located on a second surface 122a of the second protrusion 122. The button 130 is electrically connected to the circuit board 140. The circuit board 140 is connected to the rod portion 123, and the button 130 is closer to the pen tip 121 than the circuit board 140. A processor and a wireless transmission module (for example, an infrared or Bluetooth transceiver module) may be disposed on the circuit board 140. The button 130, the first sensor 160, and the second sensor 170 are respectively electrically connected to the circuit board 140, and the battery 150 is configured to provide power needed by operation of the button 130, the first sensor 160, the second sensor 170, and the circuit board 140.

The battery 150 is connected to the circuit board 140, wherein the second sensor 170 is connected to the battery 150 and the battery 150 is located between the circuit board 140 and the second sensor 170. The rod portion 123 is connected to the first sensor 160, wherein the first sensor 160 is connected to the pen tip 121 and the first sensor 160 is located between the rod portion 123 and the pen tip 121. For example, the first sensor 160 may be a pressure sensor, and is configured to sense magnitude of pressure applied to the pen tip 121, and transmit a corresponding value to the processor on the circuit board 140. The second sensor 170 may be a G-sensor, and transmits a signal sensed by the second sensor 170 to the processor on the circuit board 140, to determine, by means of the processor, an operating action performed on the stylus 100A by the user. On the other hand, the wireless transmission module on the circuit board 140 may transmit a signal obtained after operating processing of the processor to a smartphone, a tablet computer, or a notebook computer.

In the present embodiment, the button 130 may be an electronic switch; when the stylus 100A switches from the first status (the status in which the pen tip 121 is retracted in the pen barrel 110) to the second status (the status in which the pen tip 121 is exposed out of the pen barrel 110), the button 130 located on the second surface 122a of the second protrusion 122 is pushed by the first surface 112a of the first protrusion 112 to generate a start signal, and transmits the start signal to the processor on the circuit board 140, to enable a touch function of the stylus 100A. It should be particularly noted that the stylus 100 of the first embodiment may also be configured with a button 130, a circuit 140, a battery 150, a first sensor 160, a second sensor 170, or same or similar elements.

Figure 3A:
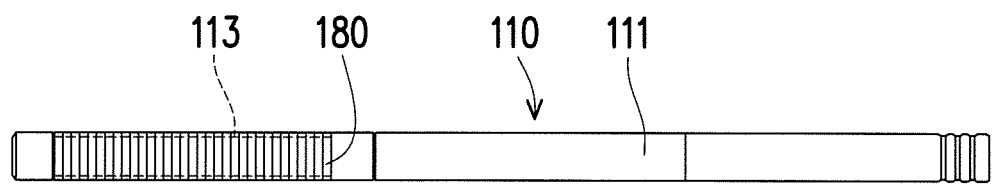
FIG. 3A and FIG. 3B are schematic views of switching from a first status to a second status by a stylus according to a third embodiment of the present disclosure.
Figure 3B:
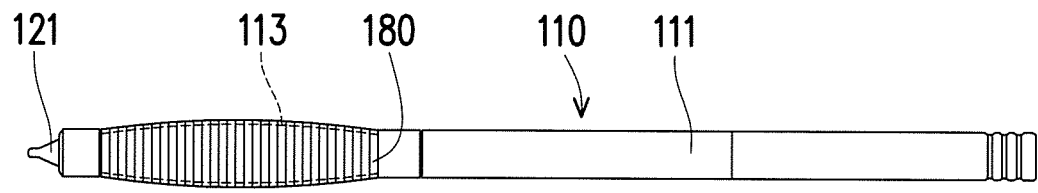

FIG. 3A and FIG. 3B are schematic views of switching from a first status to a second status by a stylus according to a third embodiment of the present disclosure. Referring to FIG. 3A and FIG. 3B, an internal structure of a stylus 100B of the present embodiment may be the same as or similar to an internal structure of the stylus 100 or the stylus 100A, that is, a mechanism that the stylus 100B makes a holding portion 113 expand and deform is the same as or similar to that of the stylus 100 or the stylus 100A. In detail, the stylus 100B further comprises a pen cap 180, which is sleeved on the holding portion 113, and may be formed by rubber or a similar material. Therefore, when a user holds the holding portion 113 by using fingers, the pen cap 180 can generate large friction, so as to prevent the stylus 100B from carelessly slipping down from a hand of the user. On the other hand, when the stylus 100B switches from the first status (the status in which a pen tip 121 is retracted in a pen barrel 110) to the second status (the status in which the pen tip 121 is exposed out of the pen barrel 110), the pen cap 180 expands and deforms with the holding portion 113.

Figure 4A:
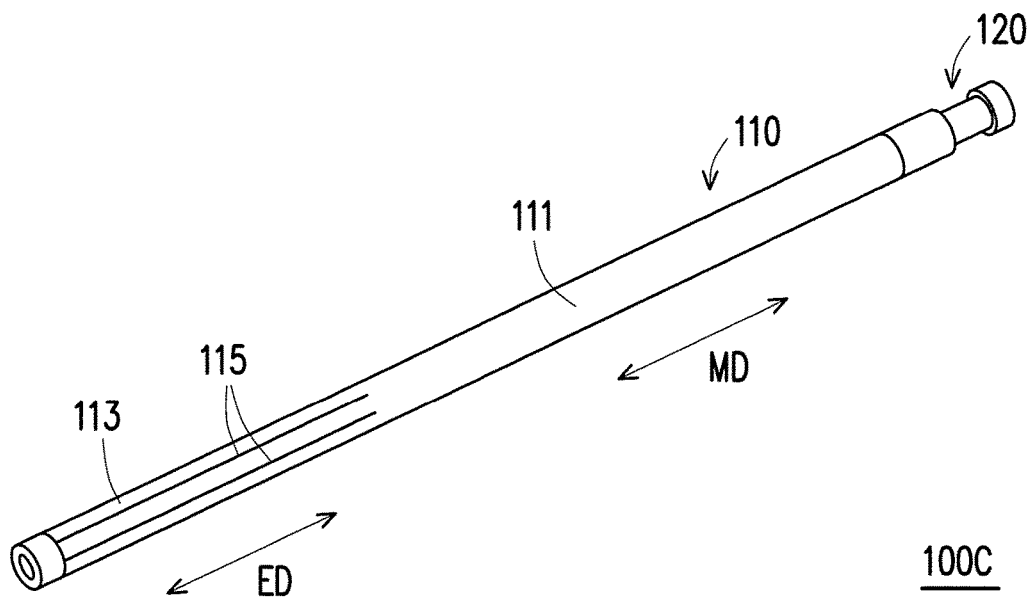
FIG. 4A and FIG. 4B are schematic views of switching from a first status to a second status by a stylus according to a fourth embodiment of the present disclosure.
Figure 4B:
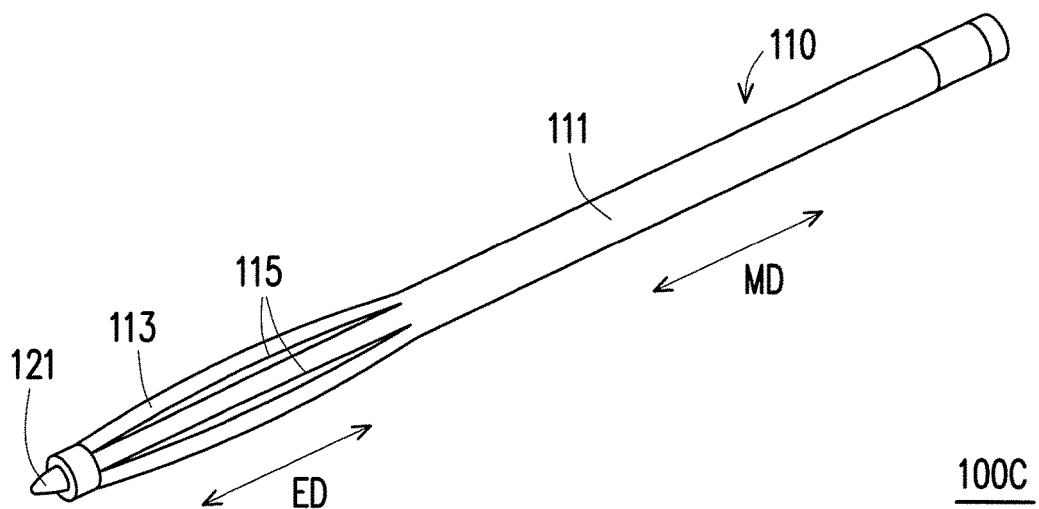

FIG. 4A and FIG. 4B are schematic views of switching from a first status to a second status by a stylus according to a fourth embodiment of the present disclosure. Referring to FIG. 4A and FIG. 4B, an internal structure of a stylus 100C of the present embodiment may be the same as or similar to an internal structure of the stylus 100 or the stylus 100A, that is, a mechanism that the stylus 100C makes a holding portion 113 expand and deform is the same as or similar to that of the stylus 100 or the stylus 100A. In detail, the pen barrel 110 of the stylus 100C further comprises a plurality of slits 115, which are located on the holding portion 113, and the slits 115 that are parallel to each other pass through the sidewall 111. An extending direction ED of each of the slits 115 is parallel to a moving direction MD, in which a core 120 moves back and forth relative to a pen barrel 110. When the stylus 100C switches from the first status (the status in which a pen tip 121 is retracted in the pen barrel 110) to the second status (the status in which the pen tip 121 is exposed out of the pen barrel 110), the slits 115 expand with expansion and deformation of the holding portion 113. That is, the slits 115 facilitate ensuring uniform expansion and deformation of the holding portion 113.

Figure 5A:
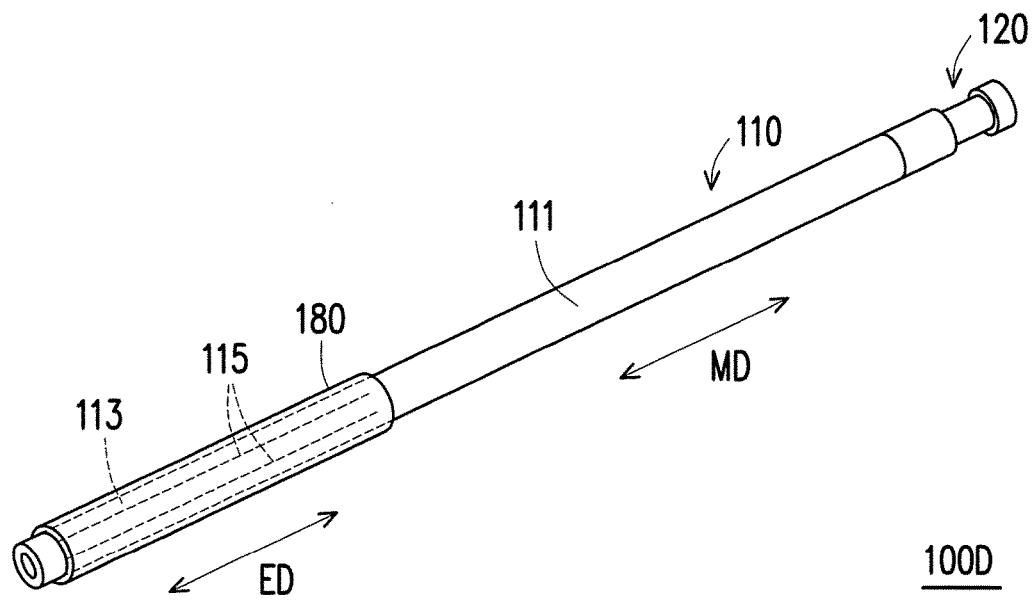
FIG. 5A and FIG. 5B are schematic views of switching from a first status to a second status by a stylus according to a fifth embodiment of the present disclosure.
Figure 5B:
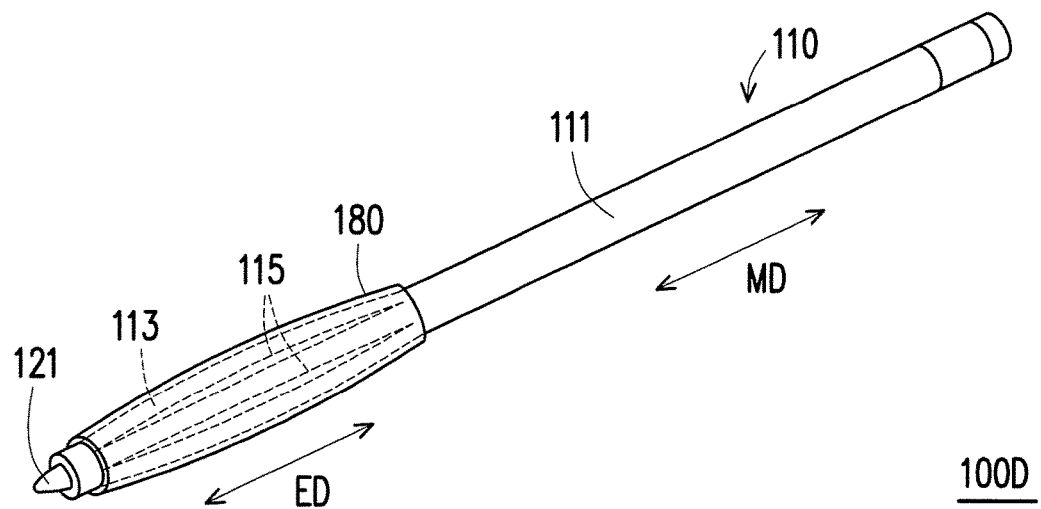

FIG. 5A and FIG. 5B are schematic views of switching from a first status to a second status by a stylus according to a fifth embodiment of the present disclosure. Referring to FIG. 5A and FIG. 5B, a stylus 100D of the present embodiment is approximately similar to the stylus 100C of the fourth embodiment, and the main difference lies in that: the stylus 100D further sleeves a pen cap 180 on a holding portion 113 to cover the slits 115. In this way, not only integrity of an appearance of the stylus 100D can be kept, but also the stylus 100D can be prevented from carelessly slipping down from a hand of a user.

Figure 6A:
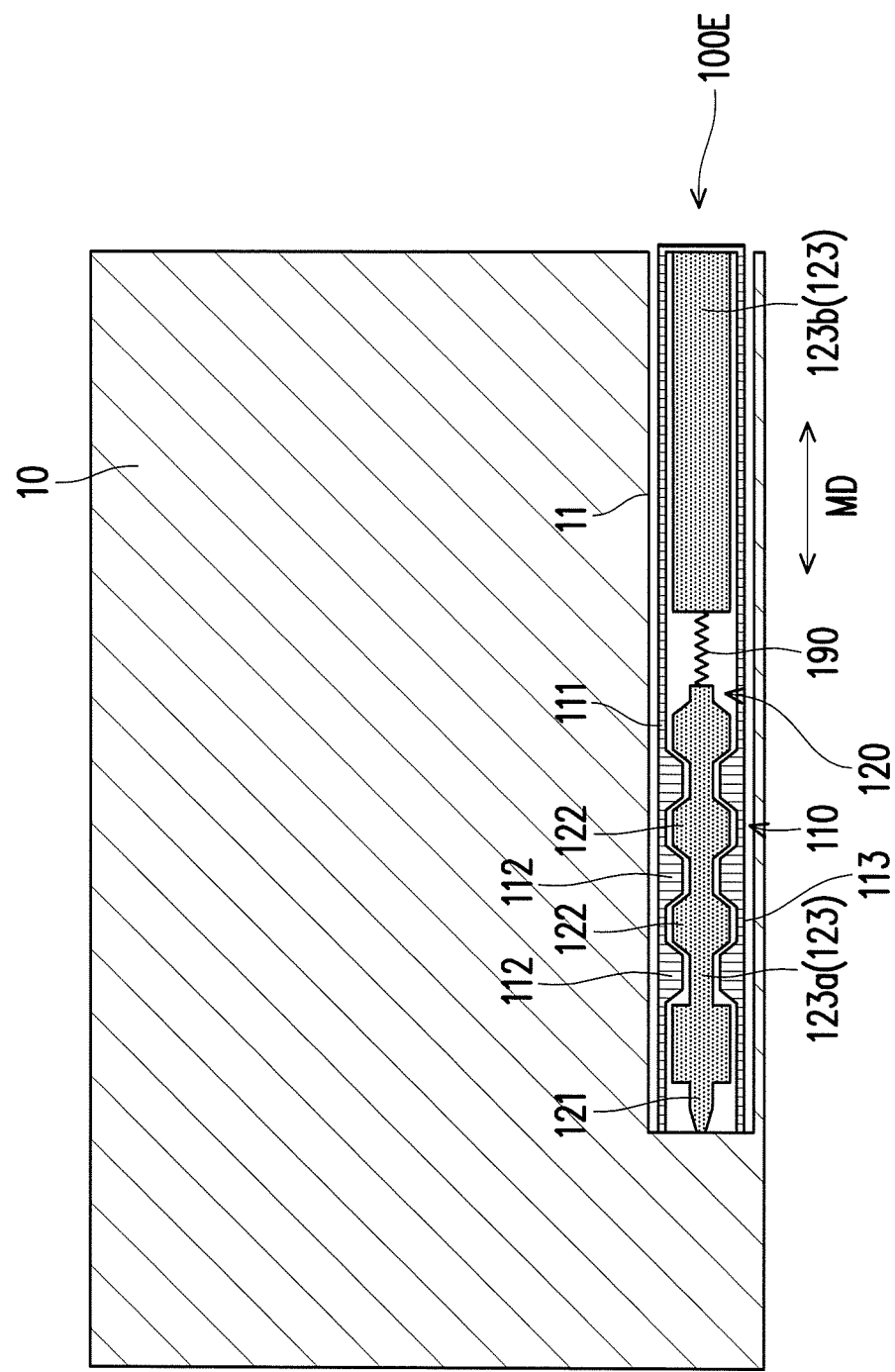
FIG. 6A and FIG. 6B are schematic cross-sectional views of taking a stylus out of an electronic device according to a sixth embodiment of the present disclosure.
Figure 6B:
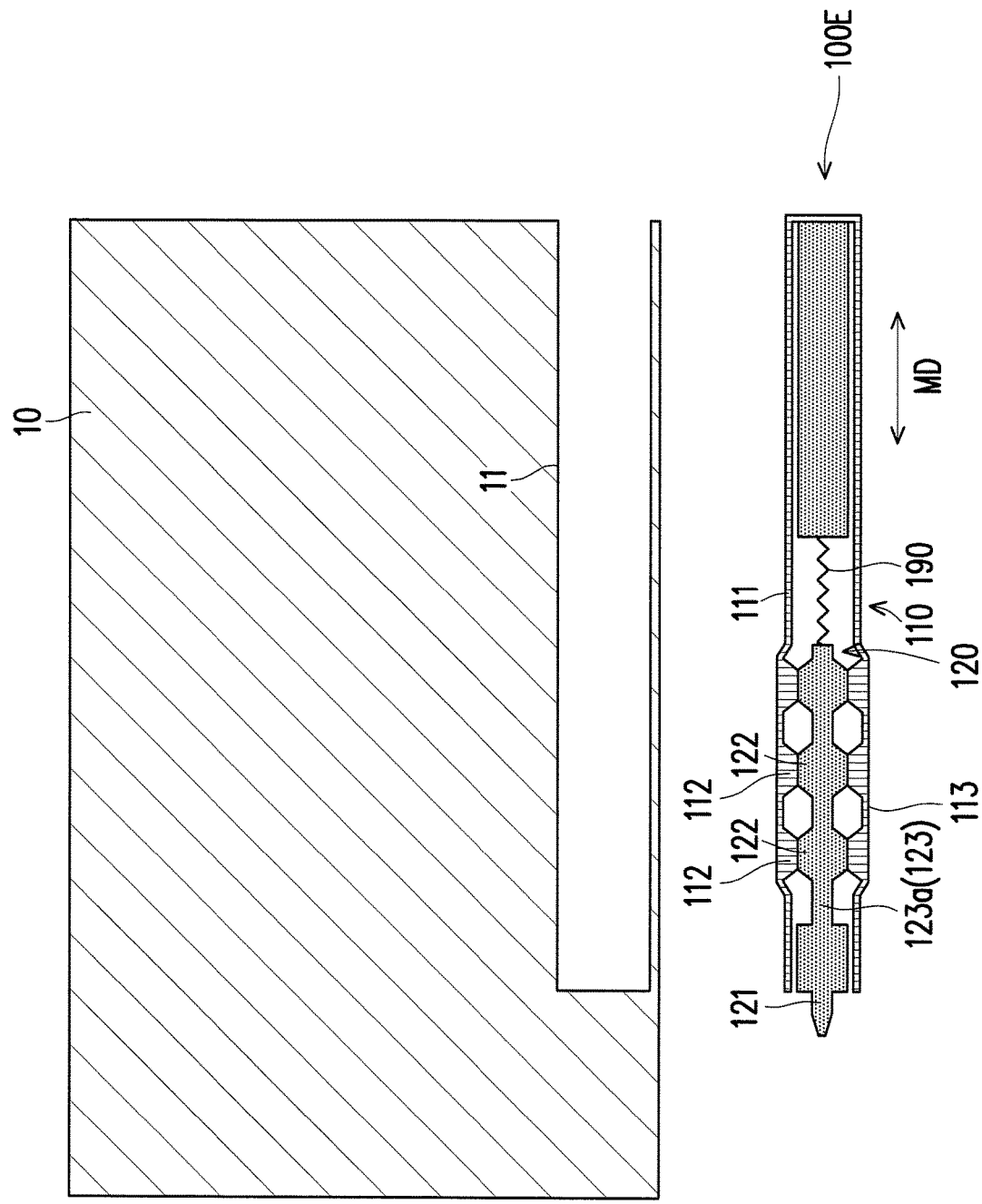

FIG. 6A and FIG. 6B are schematic cross-sectional views of taking a stylus out of an electronic device according to a sixth embodiment of the present disclosure. Referring to FIG. 6A and FIG. 6B, an electronic device 10 may be a smartphone, a tablet computer, or a notebook computer, and comprises an accommodating groove 11 configured to accommodate a stylus 100E. When the stylus 100E is accommodated in the accommodating groove 11, the stylus 110E is in the first status (the status in which a pen tip 121 is retracted in a pen barrel 110). In the present embodiment, a mechanism that the stylus 100E makes a holding portion 113 expand and deform is the same as or similar to that of the stylus 100 or the stylus 100A, and therefore the descriptions thereof are omitted herein. In detail, a rod portion 123 of a core 120 of the stylus 100E may comprise a first rod portion 123a and a second rod portion 123b opposite to each other. The pen tip 121 and the second rod portion 123b are respectively located on opposite two sides of the first rod portion 123a, wherein the pen tip 121 is connected to the first rod portion 123a and the second protrusion 122 is located on the first rod portion 123a.

The stylus 100E further comprises an elastic component 190, and two opposite end portions of the elastic component 190 respectively abut against the first rod portion 123a and the second rod portion 123b. That is, the first rod portion 123a and the second rod portion 123b are respectively located on opposite two sides of the elastic component 190. When the stylus 100E is under the first status (the status in which the pen tip 121 is retracted in the pen barrel 110), the elastic component 190 is compressed between the first rod portion 123a and the second rod portion 123b to generate elastic deformation. When the stylus 100E is moved out of the accommodating groove 11, the elastic component 190 restores to drive the first rod portion 123a and the pen tip 121 to move along a moving direction MD, to make the stylus 100E switch from the first status (the status in which the pen tip 121 is retracted in the pen barrel 110) to the second status (the status in which the pen tip 121 is exposed out of the pen barrel 110).

Further, because after the stylus 100E is taken out of the electronic device 10, the first protrusions 112 and the second protrusions 122 are aligned with each other and abut against each other, the holding portion 113 of the pen barrel 110 can expand and deform to thicken, so as to provide good holding or operating hand feeling of a user. On the other hand, when the stylus 100E is retracted into the accommodating groove 11, the core 120 can move along a moving direction MD, to make the first protrusion 112 and the second protrusion 122 dislocated from each other again, so that the holding portion 113 of the pen barrel 110 returns to a status before expansion and deformation. At this time, the holding portion 113 of the pen barrel 110 attenuates, and therefore can make the stylus 100E smoothly accommodated in the light and thin electronic device 10.

Figure 7A:
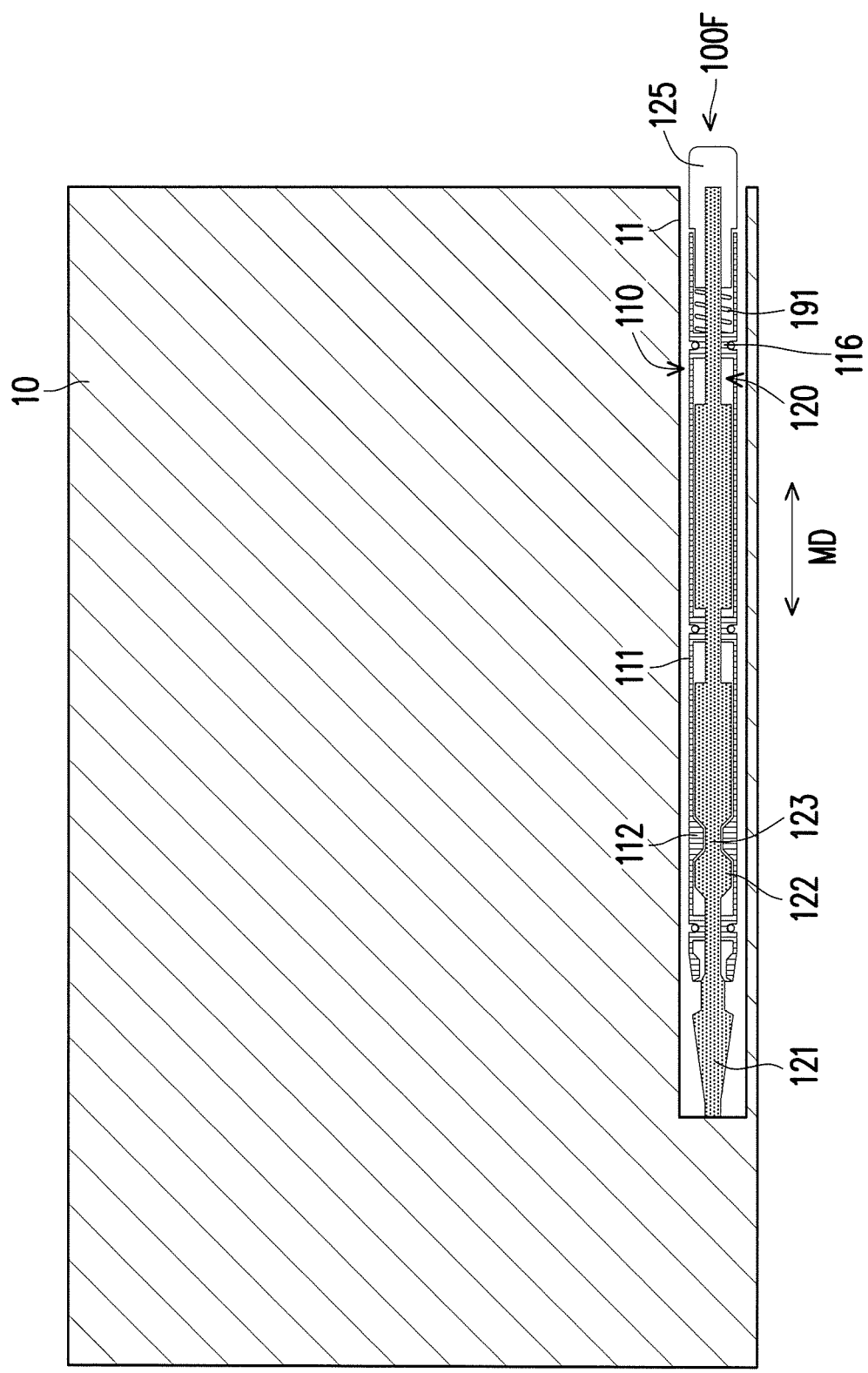
FIG. 7A and FIG. 7B are schematic cross-sectional views of taking a stylus out of an electronic device according to a seventh embodiment of the present disclosure.
Figure 7B:
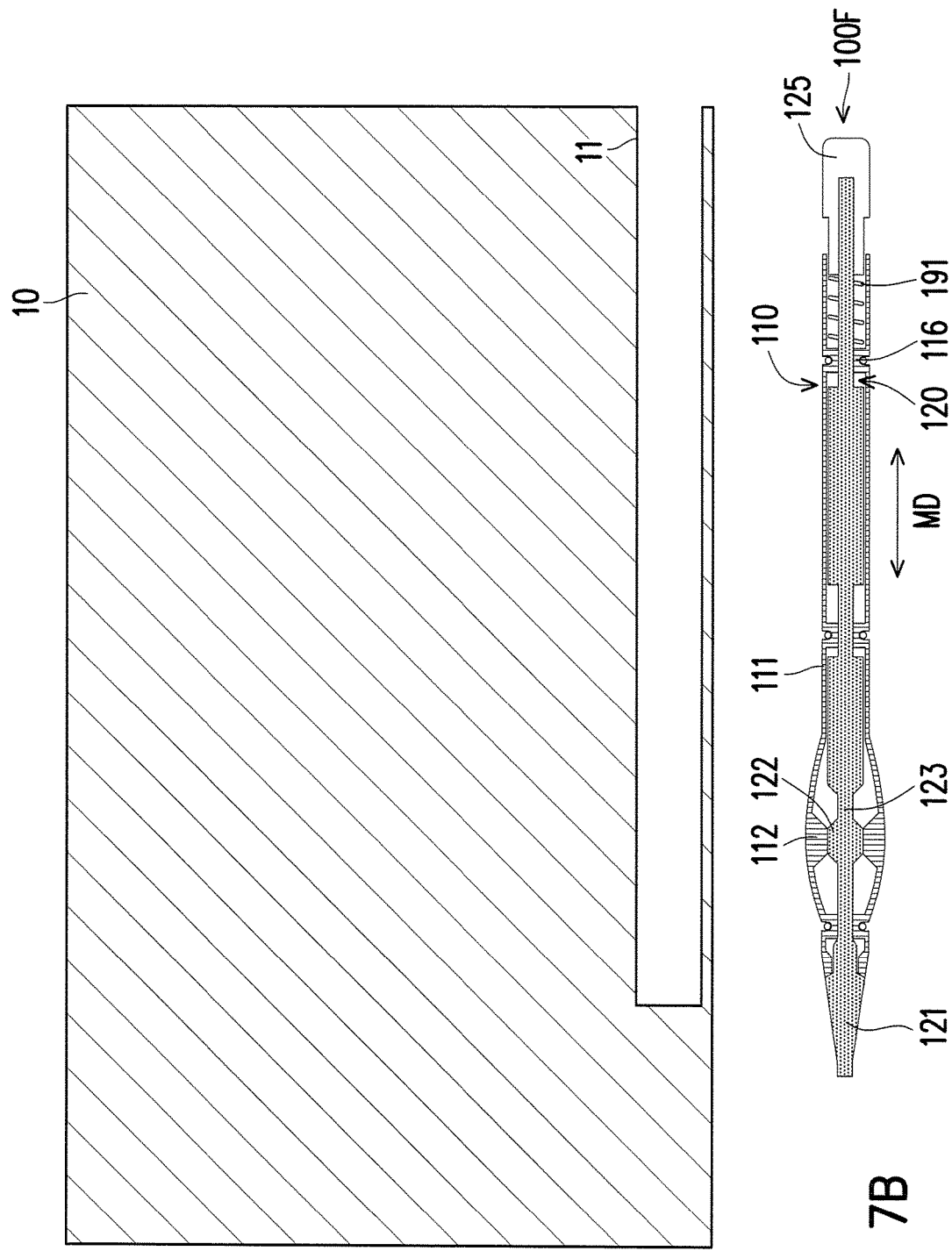

FIG. 7A and FIG. 7B are schematic cross-sectional views of taking a stylus out of an electronic device according to a seventh embodiment of the present disclosure. Referring to FIG. 7A and FIG. 7B, an electronic device 10 may be a smartphone, a tablet computer, or a notebook computer, and comprises an accommodating groove 11 configured to accommodate a stylus 100F. In the present embodiment, a core 120 of the stylus 100F further comprises an end portion 125. A pen tip 121 and the end portion 125 are respectively located on opposite two sides of a second protrusion 122 (or a rod portion 123). The end portion 125 is connected to the rod portion 123 and the end portion 125 is exposed out of the pen barrel 110. On the other hand, under the first status, the pen tip 121 of the stylus 100F is exposed out of the pen barrel 110, and the second protrusion 122 is closer to the pen tip 121 than the first protrusion 112. That is, the second protrusion 122 is located between the first protrusion 112 and the pen tip 121, and the first protrusion 112 and the second protrusion 122 are dislocated from each other.

On the other hand, the stylus 100F further comprises an elastic component 191, sleeved on the core 120 and located in the pen barrel 110. In the present embodiment, the pen barrel 110 further comprises a position limiting portion 116 located at an inner side of a sidewall 111, and two opposite end portions of the elastic component 191 respectively abut against the position limiting portion 116 and the end portion 125. When the stylus 100F is accommodated in the accommodating groove 11, the stylus 100F is in the first status and the elastic component 191 is compressed between the position limiting portion 116 and the end portion 125 to generate elastic deformation. When the stylus 100F is moved out of the accommodating groove 11, the elastic component 191 restores and drives the end portion 125, to drive the core 120 to move along a moving direction MD, to make the stylus 100F switch from the first status to the second status. At this time, the pen tip 121 is still exposed out of the pen barrel 110. However, the pen tip 121 under the second status is closer to the pen barrel 110 than the pen tip 121 under the first status, or abuts against the pen barrel 110.

Further, because after the stylus 100F is taken out of the electronic device 10, a first protrusion 112 and a second protrusion 122 are aligned with each other and abut against each other, the holding portion 113 of the pen barrel 110 can expand and deform to thicken, so as to provide good holding or operating hand feeling of a user. On the other hand, the user can make, in a manner of pressing the end portion 125, the core 120 move along a moving direction MD, to make the first protrusion 112 and the second protrusion 122 dislocated from each other again, so that the holding portion 113 of the pen barrel 110 returns to a status before expansion and deformation. At this time, the holding portion 113 of the pen barrel 110 attenuates, and therefore can make the stylus 100F smoothly accommodated in the light and thin electronic device 10.

Based on the above, the stylus of the present disclosure can change a thickness of a part of a pen barrel by means of a first protrusion of the pen barrel and a second protrusion of a core that are separated from or abut against each other. When a user needs to perform a tapping action on a touchscreen or a touchpad by using the stylus, the user can make the first protrusion of the pen barrel abut against the second protrusion of the core to make the part of the pen barrel expand and deform, so as to provide good holding or operating hand feeling of the user.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A stylus, suitable for being accommodated in or moved out of an electronic device, comprising:
a pen barrel, having a sidewall and at least one first protrusion, wherein the first protrusion is located at an inner side of the sidewall; and
a core, movably passing through the pen barrel, wherein the core has a pen tip and at least one second protrusion,
under a first status, the pen tip is retracted in the pen barrel, and the first protrusion and the second protrusion are dislocated from each other,
under a second status, the pen tip is exposed out of the pen barrel, and the first protrusion and the second protrusion are aligned with each other to make a part of the pen barrel expand and deform.

2. The stylus as recited in claim 1, wherein the pen barrel further has a holding portion, and the first protrusion is located at the inner side of the sidewall corresponding to the holding portion,
under the second status, the first protrusion and the second protrusion are aligned with each other to make the holding portion of the pen barrel expand and deform.

3. The stylus as recited in claim 2, further comprising:
a pen cap, sleeved on the holding portion.

4. The stylus as recited in claim 2, wherein the pen barrel further has a plurality of slits, and the slits are located on the holding portion, an extending direction of each of the slits is parallel to a moving direction, in which the core moves back and forth relative to the pen barrel.

5. The stylus as recited in claim 4, further comprising:
a pen cap, sleeved on the holding portion and covering the slits.

6. The stylus as recited in claim 1, wherein the first protrusion has a first surface, and the second protrusion has a second surface,
under the first status, the first surface and the second surface are separated from each other,
under the second status, the first surface abuts against the second surface to make a part of the pen barrel expand and deform.

7. The stylus as recited in claim 1, wherein the number of the first protrusion is plural, a recess is defined between any adjacent two of the first protrusions,
under the first status, the second protrusion is accommodated in the recess.

8. The stylus as recited in claim 1, wherein the number of the first protrusion is plural and the number of the second protrusion is plural, a first recess is defined between any adjacent two of the first protrusions and a second recess is defined between any adjacent two of the second protrusions,
under the first status, some of the second protrusions are respectively accommodated in the first recesses, and some of the first protrusions are respectively accommodated in the second recesses.

9. The stylus as recited in claim 1, wherein the core further has a first rod portion and a second rod portion opposite to each other, the pen tip and the second rod portion are respectively located on opposite two sides of the first rod portion, the pen tip is connected to the first rod portion and the second protrusion is located on the first rod portion.

10. The stylus as recited in claim 9, further comprising:
an elastic component, abutting against the first rod portion and the second rod portion,
when the stylus is accommodated in the electronic device, the stylus is in the first status and the elastic component is compressed to generate elastic deformation,
when the stylus is moved out of the electronic device, the elastic component restores to drive the first rod portion and the pen tip to move, so that the stylus switches from the first status to the second status.

11. The stylus as recited in claim 1, wherein the core further has an end portion, the pen tip and the end portion are respectively located on opposite two sides of the second protrusion, and the end portion is exposed out of the pen barrel.

12. The stylus as recited in claim 11, further comprising:
an elastic component, sleeved on the core and located in the pen barrel, wherein the pen barrel further has a position limiting portion located at the inner side of the sidewall, and the elastic component abuts against the position limiting portion and the end portion,
when the stylus is accommodated in the electronic device, the stylus is in the first status and the elastic component is compressed to generate elastic deformation,
when the stylus is moved out of the electronic device, the elastic component restores and drives the end portion to drive the core to move, so that the stylus switches from the first status to the second status.

13. The stylus as recited in claim 12, wherein the pen tip is exposed out of the pen barrel under the first status and the second status.

14. A stylus, suitable for being accommodated in or moved out of an electronic device, comprising:
a pen barrel, having a sidewall and at least one first protrusion, wherein the first protrusion is located at an inner side of the sidewall; and
a core, movably passing through the pen barrel, wherein the core has a pen tip, at least one second protrusion and an end portion, the pen tip and the end portion are respectively located on opposite two sides of the second protrusion, and the end portion is exposed out of the pen barrel,
under a first status, the first protrusion and the second protrusion are dislocated from each other,
under a second status, the first protrusion and the second protrusion are aligned with each of to make a part of the pen barrel expand and deform.

15. The stylus as recited in claim 14, wherein the pen barrel further has a plurality of slits, and the slits are located on the holding portion, an extending direction of each of the slits is parallel to a moving direction, in which the core moves back and forth relative to the pen barrel.

16. The stylus as recited in claim 15, further comprising:
a pen cap, sleeved on the holding portion and covering the slits.

17. The stylus as recited in claim 14, wherein the core further has a first rod portion and a second rod portion opposite to each other, the pen tip and the second rod portion are respectively located on opposite two sides of the first rod portion, the pen tip is connected to the first rod portion and the second protrusion is located on the first rod portion, and the stylus further comprises an elastic component abutting against the first rod portion and the second rod portion,
when the stylus is accommodated in the electronic device, the stylus is in the first status and the elastic component is compressed to generate elastic deformation,
when the stylus is moved out of the electronic device, the elastic component restores to drive the first rod portion and the pen tip to move, so that the stylus switches from the first status to the second status.

18. The stylus as recited in claim 14, further comprising:
an elastic component, sleeved on the core and located in the pen barrel, wherein the pen barrel further has a position limiting portion located at the inner side of the sidewall, and the elastic component abuts against the position limiting portion and the end portion,
when the stylus is accommodated in the electronic device, the stylus is in the first status and the elastic component is compressed to generate elastic deformation,
when the stylus is moved out of the electronic device, the elastic component restores and drives the end portion to drive the core to move, so that the stylus switches from the first status to the second status.

19. The stylus as recited in claim 18, wherein the pen tip is exposed out of the pen barrel under the first status and the second status.

* * * * *